Dec. 12, 1961 S. FRIEDMAN 3,012,368
SPACESHIP NAVIGATION GAME APPARATUS
Filed Jan. 15, 1959 4 Sheets-Sheet 2
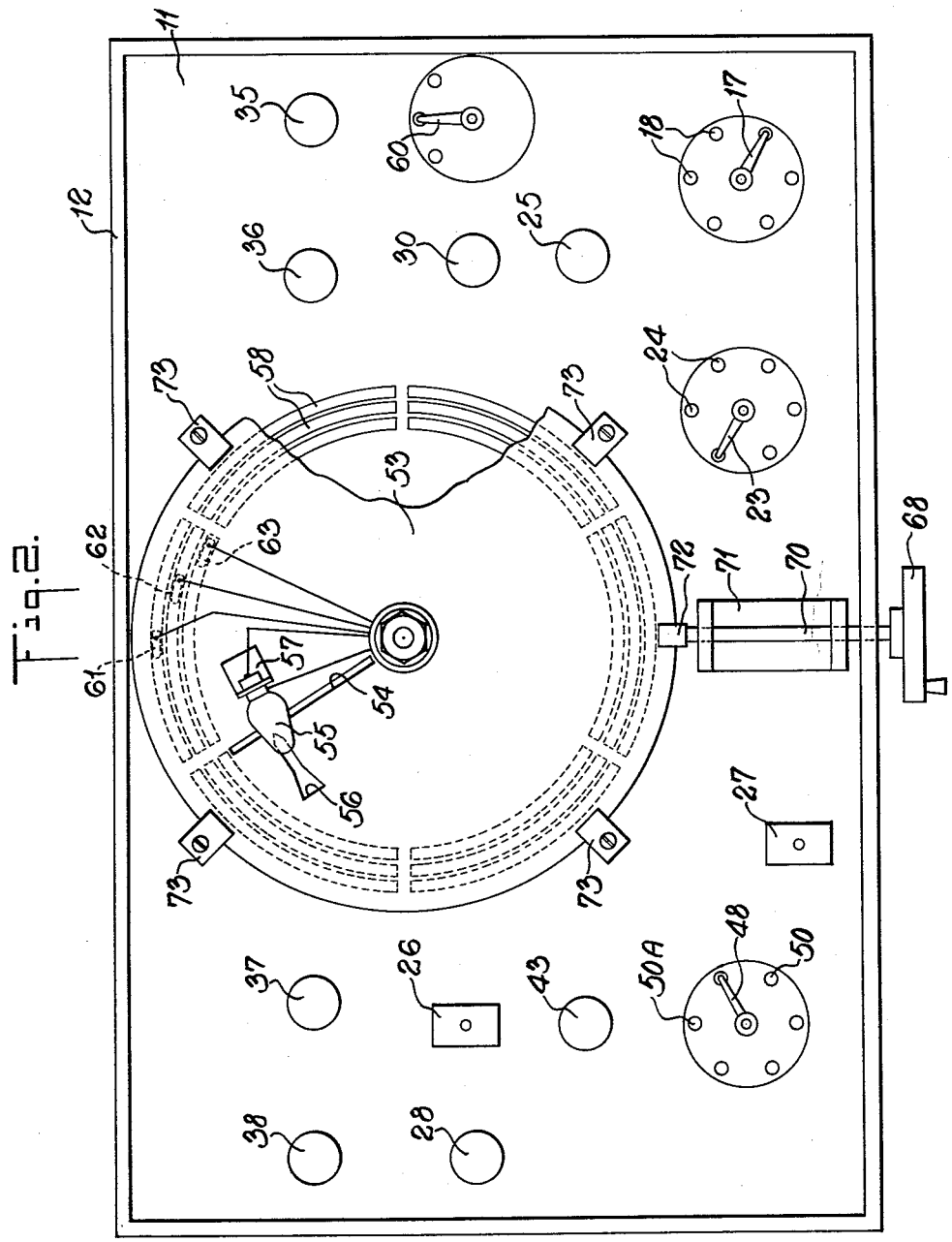

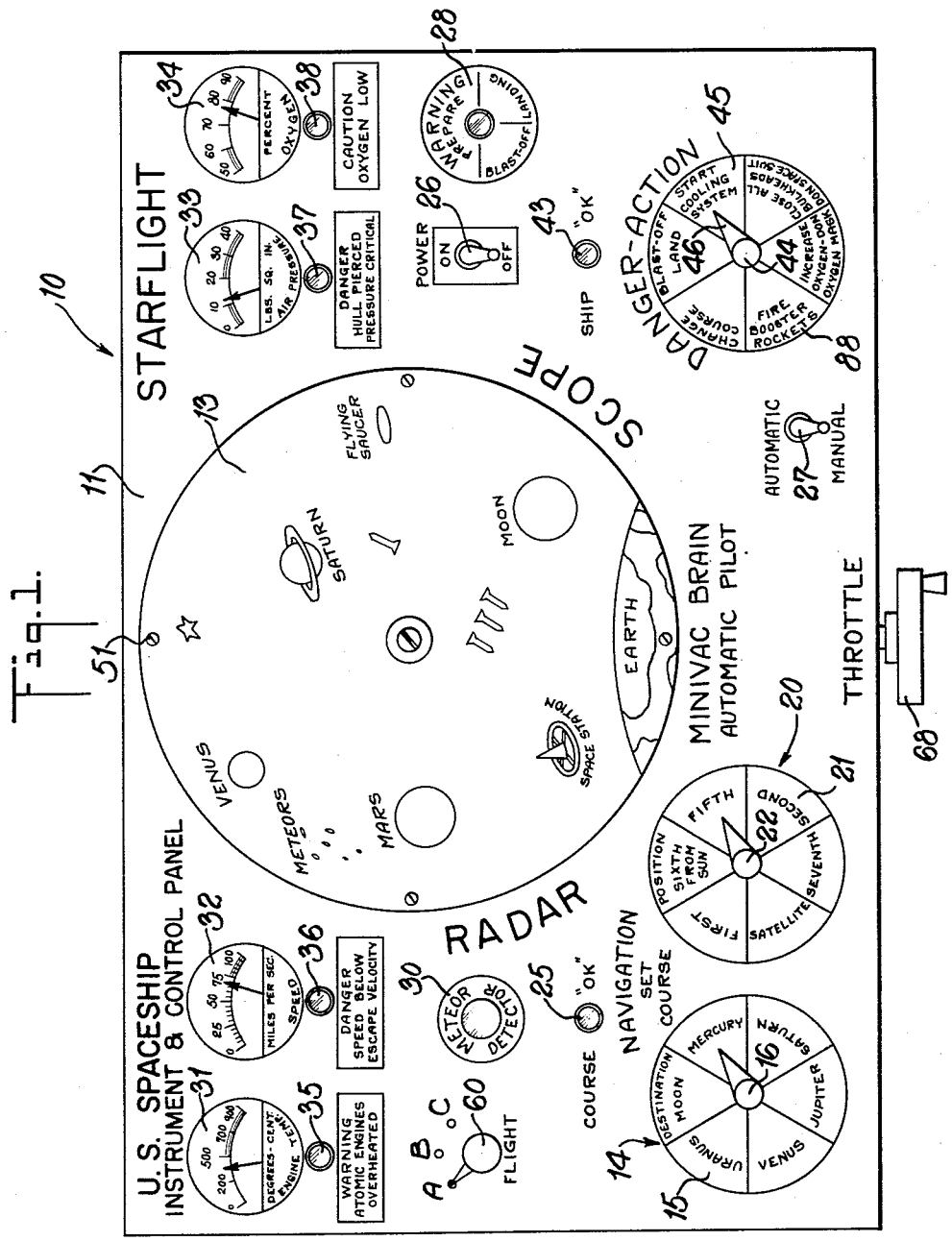

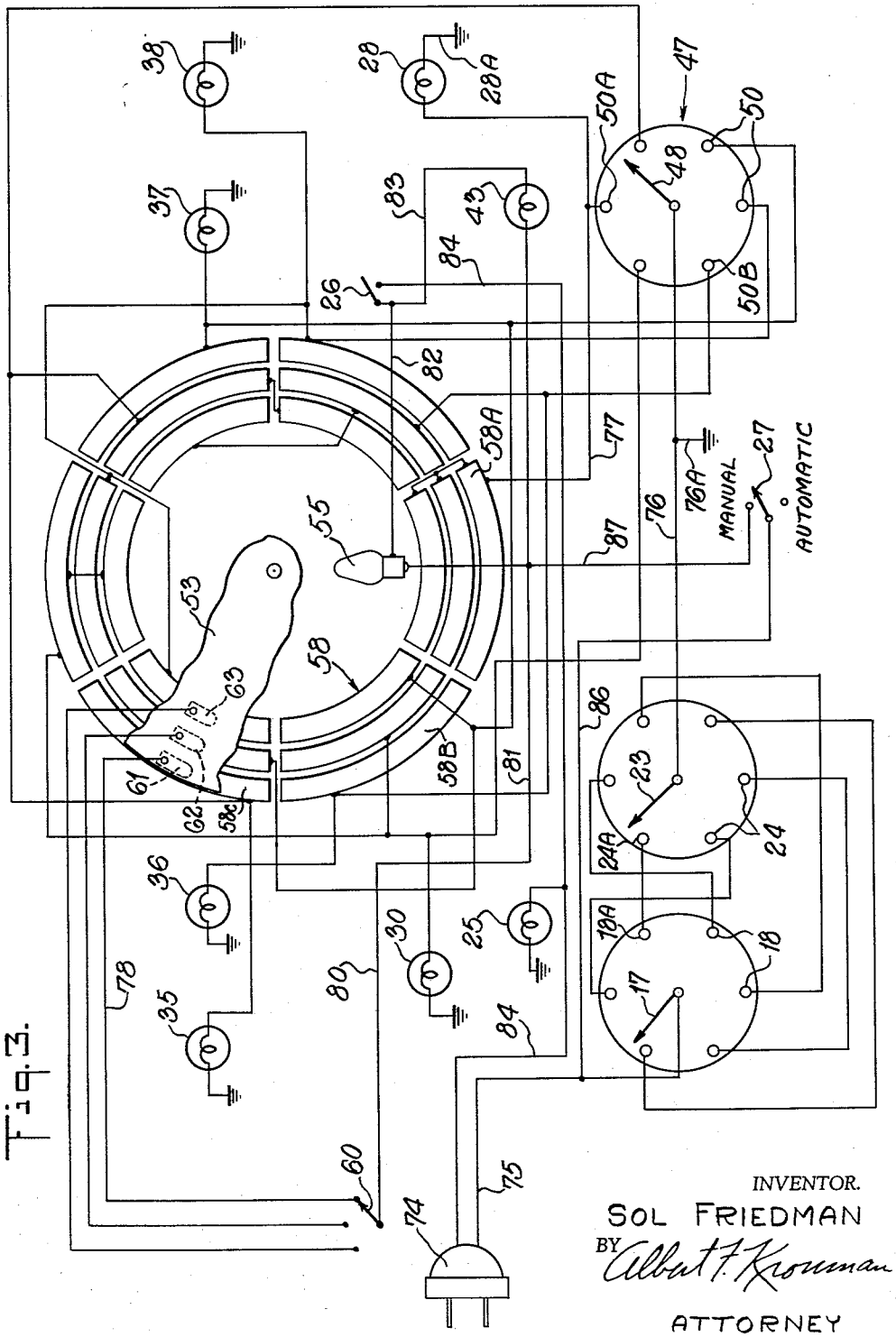

Dec. 12, 1961     S. FRIEDMAN     3,012,368

SPACESHIP NAVIGATION GAME APPARATUS

Filed Jan. 15, 1959     4 Sheets-Sheet 4

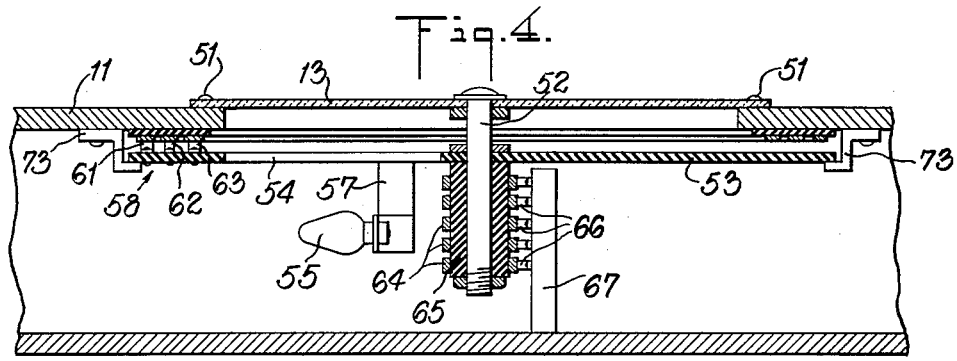

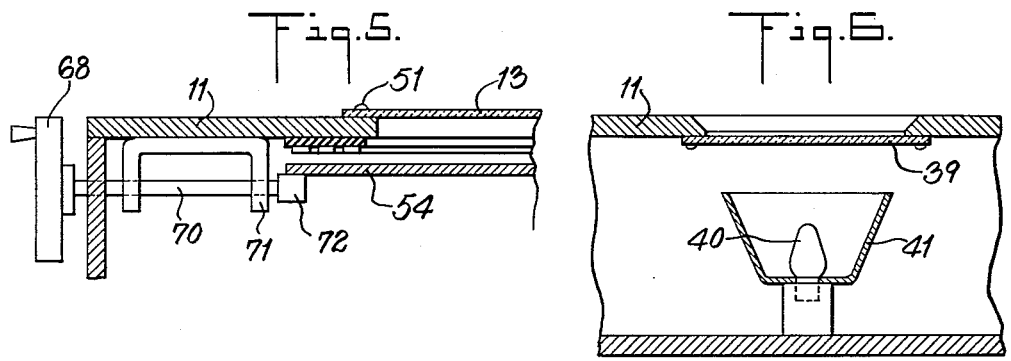

Fig. 7.

| DESTINATION | POSITION |
|---|---|
| MOON | SATELLITE |
| MERCURY | FIRST |
| VENUS | SECOND |
| JUPITER | FIFTH |
| SATURN | SIXTH |
| URANUS | SEVENTH |

Fig. 8.

| WARNING | ACTION |
|---|---|
| HOT ENGINES | COOLING SYSTEM |
| SPEED LOW | FIRE ROCKETS |
| PRESSURE LOW | SPACE SUITS |
| OXYGEN LOW | OXYGEN MASK |
| METEORS | CHANGE COURSE |
| START-LAND | BLAST-OFF |

INVENTOR
SOL FRIEDMAN
BY Albert F. Krouman
ATTORNEY

United States Patent Office 3,012,368
Patented Dec. 12, 1961

3,012,368
SPACESHIP NAVIGATION GAME APPARATUS
Sol Friedman, 266 E. 200th St., Bronx, N.Y.
Filed Jan. 15, 1959, Ser. No. 786,944
5 Claims. (Cl. 46—226)

This invention relates to a game apparatus which may be played by a single person. The invention has particular reference to a game in which a simulated space ship is operated to travel from the earth to a satellite or planet.

The game apparatus herein described includes considerable information regarding the positions of various planets and the moon and indicates many of the hazards and dangerous conditions which are encountered during a flight through outer space. The game is therefore educational and has considerable interest for children who have been informed about the possibilities of space travel.

One of the objects of the invention is to provide an improved game apparatus which is interesting and instructive.

Another object of the invention is to provide a game apparatus which is housed in a single container and which at the same time simulates many of the conditions present in interplanetary flight.

Another object of the invention is to limit the operation of the space ship movement until certain operating conditions have been fulfilled.

Another object of the invention is to teach the player of the game the hazards of space flight and ways of eliminating such hazards.

One feature of the invention includes a translucent screen which shows a representation of interplanetary space. Illuminating means are provided for lighting portions of the screen and a rotatable mask is positioned between the illuminating means and the screen for simulating the rotary beam of a radar scope and for showing an image of a space ship. A number of meters and other indicating means are selectively illuminated by lamps for indicating dangerous conditions which may exist during a simulated flight operation. These lamps are lighted by connections through conductive segments which are spaced around the rotatable mask. A number of visual means are provided for indicating when dangerous conditions have been remedied, these means being illuminated by other lamps. Manually operated switches are provided for the player for moving to a position which indicates a remedy for the dangerous condition, these switches including circuit elements which disconnect the lamps associated with the meters and connect other lamps for indicating a remedy.

Another feature of the invention includes a crank turned by the player which rotates the mask and moves the image of the space ship from the earth to various planets.

Another feature of the invention includes a switching means for substituting one set of conductor segments for another to alter the sequence of dangerous conditions as they occur during a flight operation.

For a better understanding of the present invention, together with other and further objects thereof, reference is made to the following description taken in connection with the accompanying drawings.

FIG. 1 is a plan view of the game apparatus showing the translucent screen and the other components of the game necessary for a complete flight.

FIG. 2 is a rear view of the top panel showing the location of the main components but omitting the electrical wiring.

FIG. 3 is a wiring diagram.

FIG. 4 is a cross sectional view taken through the central shaft which supports the rotatable mask.

FIG. 5 is a cross sectional view showing how the throttle operates to move the mask.

FIG. 6 is a cross sectional view taken through the center of one of the meter dials showing how it may be illuminated from the interior of the cabinet.

FIG. 7 is a chart showing the correspondence between the various planets and their position.

FIG. 8 is a chart showing the correspondence between the danger signals and the remedies.

Referring now to FIGS. 1 and 2, the game is enclosed within a container 10 having an upper panel 11 and lower supporting walls 12. All the apparatus is enclosed within this container except the throttle wheel and the cord and plug for the application of electrical power. A translucent screen 13 is mounted near the center of the panel 11 and shows representations of a portion of the earth, several planets, the moon, and various other objects which may be encountered in a flight through the space above the earth. A switching arrangement 14 at the lower left side of the panel 11 includes a dial 15, and a knob 16. A rotating contact arm 17 (see FIG. 2), and six stationary contacts 18 are arranged for the selection of a destination. The dial 15 is divided into six quadrants, each labeled with the name of a heavenly body.

A second switch 20 is positioned beside switch 14 and is arranged for showing the position from the sun of the planet shown on dial 15. Switch 20 includes a dial 21, a rotatable knob 22, a contact arm 23, and six stationary contacts 24. Connections between contacts 18 and 24 are shown in FIG. 3, the electrical circuits being such that a lamp 25 indicating "Course OK" is not lighted unless the knob showing the position is in agreement with the knob showing the destination.

A power switch 26 is provided for turning on all the electric power while another switch 27, marked "Automatic" and "Manual," switches in a by-pass circuit for simplified operation. The panel also contains six illuminated portions which indicate either dangerous conditions or else a warning 28 that the ship is about to take off or land. A second lamp 30 is for indicating the presence of meteors while four other meter dials 31, 32, and 33, 34, indicate respectively over-heated engines, reduced speed, a leaky hull, and low oxygen pressure. These warning signals may be flashed to the player by small lamps 35, 36, 37, and 38, positioned directly under the meter scales or they may include a system of illumination as shown in FIG. 6 where the meter scale 39 is translucent and a lamp 40 surrounded by a reflector 41 is provided to illuminate the entire meter dial. Another lamp is provided to indicate "Ship OK." The two lamps 25 and 43 are connected in the wiring system so that a correct positioning of knob 22 will light lamp 25 and a correct positioning of another knob 44 will light lamp 43.

One of the major objectives of the game is to correct the dangerous conditions which occur in the space ship as it travels through the space above the earth. The dangerous conditions are switched on by a plurality of conducting segments under the panel board, to be described in detail later. As each lamp is lighted the player then turns knob 44 to a position which indicates a remedy for the danger. This position is indicated on dial 45 by a pointer 46 and a switching arrangement 47 (see FIG. 3) which includes a rotatable contact arm 48 and a plurality of stationary contacts 50.

The elements positioned under the panel 11 are shown in details in FIGS. 2, 4, 5, and 6. The translucent screen 13 is secured to the panel 11 by screws or rivets 51 and the center of the disk supports a vertical shaft 52 to which is secured a rotatable mask 53. The mask 53 is formed with a radial slit 54 which permits light to pass from a lamp 55 to the translucent screen and simulate the radial beam of a radar scope. Mask 53 also includes an opening 56 shaped to represent a space ship. Both the slit 54 and the opening 56 are positioned adjacent to the lamp 55 so that they will be well illuminated as the mask is turned. Lamp 55 is secured to the mask 53 by any convenient means such as a bracket 57.

On the underside of panel 11 a series of segments 58 are positioned. The invention may include only a single set of six segments which form a complete circular commutator means, or the game may include two or three of such sets of segments as indicated in the drawings. Only one set of segments is used during any one game operation, the selection of the sets being determined by a selector switch 60 which includes a rotatable contact arm and three stationary contacts which are connected to three brushes 61, 62, and 63 (FIG. 3). As the mask 53 is rotated brushes 61, 62, and 63, make contact with the segments 58 and alter the lamp circuits each time the brushes pass from one segment to another. The brushes and the connections to lamp 55 are connected to other elements of the electric circuit by means of a plurality of slip rings 64 (see FIG. 4). These slip rings are mounted on a tubular insulator 65 supported on shaft 52. Contact to the slip ring 64 is made by a plurality of co-acting brushes 66 supported on a vertical insulator 67 secured to a wall of the container.

The masking disc 53 is rotated by means of a crank 68, called a throttle in order to make the game more realistic. Crank 68 is secured to a shaft 70 supported by a U shaped bracket 71 which is fastened to the underside of panel 11. The inner end of shaft 70 is secured to a knob 72 which may include a surface of rubber or plastic for frictional engagement with the underside of masking disc 53 in order to rotate it when the crank 68 is turned by the player. Masking disc 53 may be held in place by any convenient means such as brackets 73 secured to the underside of panel 11.

The wiring diagram is shown in FIG. 3 and can best be described in connection with the description of the operation. In order to operate the device the player first connects an electric plug 74 to a convenient electrical outlet for the application of electrical power. Then the power switch 26 is turned to the "On" position and the automatic pilot switch 27 is moved to the "Automatic" position which opens the switch connection. Next, the player decides where the space ship is to travel and the destination is indicated by turning knob 16 (FIG. 1) to the sector which indicates the satellite or planet desired. Next the player must turn knob 22 to the position of the satellite or planet as indicated by the designated sectors. If the sector is chosen ,lamp 25 is lighted indicating "Course OK." Let it be assumed that the player decides to travel to the planet Mercury and sets knob 16 to that sector, thereby making contact with point 18A. Knob 22 is now set so that it indicates "First" position and arm 23 makes contact with point 24A. A circuit may now be traced from power conductor 75 (see FIG. 3), to arm 17, contact 18A, contact 24A, arm 23, conductor 76, to ground or the common conductor 76A. From ground, through lamp 25 (lighting it), and then back to plug 74 by means of conductor 84. Lamp 25 remains lighted as long as switch arms 17 and 23 are retained in their proper positions.

It is assumed that sliding contact 61 is making contact with the bottom segment 58A since this is the position where all flights start and finish. In this position a circuit may be traced from the ground connection 28A, through lamp 28, over conductor 77, to segment 58A, to brush 61, over conductor 78, through the arm 60 of the "Flight" selector, over conductors 80 and 81 to lamps 55 and 43, through power switch 26, and back to the power line 84. At this time the ground connection 76A is connected to the other power line 75 by dial switch arms 17 and 23. While this circuit sends current through lamps 28, 55, and 43, only lamp 28 is lighted because it is a high resistance lamp, such as a neon lamp and passes a small current. The current which lights lamp 28 divides and flows through lamps 55 and 43 and does not cause them to be lighted since they are designed for much higher current. Lamp 28, when lighted indicates "Warning" and the player must now turn knob 44 so that pointer 46 indicates "Blast-Off" and causes arm 48 to make contact with point 50A. When this is done, lamp 28 goes out and lamps 55 and 43 are lighted. Lamp 28 is short-circuited by a circuit which may be traced from ground 76A, through arm 48, and contact 50A, to the other side of lamp 28. These same circuits apply full voltage to lamps 55 and 43 causing them to light up. Lamp 55 illuminates the translucent screen 13 by showing the image of a space ship and a radial line simulating a radar scope. Lamp 43 indicates "Ship OK."

The player now proceeds by turning the throttle 68 in a clockwise direction to rotate the mask 53, the brushes, 61, 62, and 63, the image of the space ship, and the radar scope line. As soon as brush 61 moves from contact with segment 58A and makes contact with segment 58B, a new circuit is formed which may be traced from power line 75, through dial switches 14 and 20 to the ground wire, from ground connection through lamp 36, brush 61, conductor 78, switch 60, conductors 80 and 81, through lamps 55 and 43 in parallel (which do not light), through switch 26, and back to power line 84. This circuit does not light lamps 55 and 43 for the reasons stated above but lamp 36 is lighted and indicates "Danger—Speed Below Escape Velocity."

The player must now remedy the danger by moving knob 44 to a position which will remove the danger, in this case to sector 88 "Fire Booster Rockets." In this position arm 48 makes contact with point 50B and short-circuits lamp 36 and again lights the translucent screen by lamp 55 and indicates "Ship OK" by lighting lamp 43. The circuits involved in this action are similar to the circuits described above.

The player again turns the throttle 68 and moves the image of the space ship and the radar beam around the translucent screen until brush 61 moves from segment 58B to 58C. Again the lamps 55 and 43 go out and another danger lamp 35 is lighted. This indicates "Atomic Engines Overheated" and the player must move knob 44 to indicate "Start Cooling System." As before, the correct positioning of knob 44 again changes the circuit so that the danger light goes out, lamps 55 and 43 go on and the game proceeds.

The above operation continues until the disk 53 has been turned through a complete revolution and the flight is at an end. The player may then choose another destination and proceed as before. Or, the switch "Flight" 60 may be changed so that another system of segments and another brush, 62 or 63, is used. This alters the sequence of the danger signals.

It is contemplated to have knobs 16 and 22 and 44 removable and thereby release dials 15, 21, and 45. With each game a number of dials is provided, each with an identifying symbol so that three corresponding dials will be used at the same time. By this means the instructive part of the game may be increased many times and the position of many heavenly bodies defined.

The foregoing description relates to the operation of the game when switch 27 is open or thrown to the "Automatic" side, this being the most comprehensive manner of playing the game and the most instructive. If switch 27 is thrown to "Manual" a connection is made between the power conductor 75 (see FIG. 3) by way of conductor 86, and switch 27, to lamp 55 under the translucent screen, and lamp 43 indicating "Ship OK." Lamps 55 and 43 remain lighted at all times and the two Navigation dials 14 and 20 and the Danger-Action dial are all short-circuited and do not require manual operation.

Having thus fully described the invention, what is claimed as new and desired to be secured by Letters Patent of the United States is:

1. A game apparatus in the nature of a space ship navigation board comprising, a container having an upper panel and side walls, a translucent screen on said upper panel to simulate the viewing screen of a radarscope and display a representation of the space above the earth, screen illuminating means within the container, a masking member rotatably carried within the container between the screen and the screen illuminating means for obscuring all but selected portions of said screen from the illuminating means, an opening in said masking member having the outline of a space ship for projection upon the screen, means to rotate said masking member, a plurality of conductive segments within the container disposed around the masking member, brushes carried by the masking member for conductive engagement with the segments, a source of electric potential applied to said brushes and segments for energizing said game apparatus, a plurality of condition indicating first visual means on the upper panel of the container, lamps for said first visual means each electrically responsive to the contact of the brushes with a corresponding one of said conductive segments upon rotation of the masking member, a plurality of condition remedying second visual means on the upper panel of the container, a switching means for selecting one of said condition-remedying visual means, a lamp on the upper panel for signifying that a proper selection has been made and the condition remedied, and circuit means for extinguishing each of said condition-indicating lamps as they are lighted in turn by the travel of said masking member and for lighting said condition-remedied lamp upon a proper selection whereby a simulated navigation of said spaceship may then continue.

2. A game apparatus in the nature of a space ship navigation board comprising, a container having an upper panel and side walls, a translucent screen on said upper panel to simulate the viewing screen of a radarscope and display a representation of the space above the earth, screen illuminating means within the container, a masking member rotatably carried within the container between the screen and the screen illuminating means for obscuring all but selected portions of said screen from the illuminating means, an opening in said masking member having the outline of a space ship for projection upon the screen, means to rotate said masking member comprising a shaft in driving engagement with said masking member at one end and a crank secured to the other end of said shaft, a plurality of conductive segments within the container disposed around the masking member, brushes carried by the masking member for conductive engagement with the segments, a source of electric potential applied to said brushes and segments for energizing said game apparatus, a plurality of condition indicating first visual means on the upper panel of the container, lamps for said first visual means each electrically responsive to the contact of the brushes and segments upon rotation of the masking member, a plurality of condition remedying second visual means on the upper panel of the container, a switching means for selecting one of said condition-remedying visual means, a lamp on the upper panel for signifying that a proper selection has been made and the condition remedied, and circuit means for extinguishing each of said condition-indicating lamps as they are lighted in turn by the travel of said masking member and for lighting said condition-remedied lamp upon a proper selection whereby a simulated navigation of said space ship may then continue.

3. A game apparatus according to claim 1 in which the conductive segments are arranged in a series of concentric circles, the masking member is provided with a brush for each circle and each of said brushes is connected to a contact on a multiple position switch on the container for manual selection by the player of differing sequence orders in the lighting of said condition-indicating lamps.

4. A game apparatus in the nature of a space ship navigation board comprising, a container having an upper panel and side walls, a translucent screen on said upper panel to simulate the viewing screen of a radarscope and display a representation of the space above the earth, screen illuminating means within the container, a masking member rotatably carried within the container between the screen and the screen illuminating means for obscuring all but selected portions of said screen from the illuminating means, an opening in said masking member having the outline of a space ship for projection upon the screen, means to rotate said masking member, a plurality of conductive segments within the container disposed around the masking member, brushes carried by the masking member for conductive engagement with the segments, a source of electric potential applied to said brushes and segments for energizing said game apparatus, a destination selecting first switching means, a second switching means indicating the solar system locations of the selected destinations, a lamp connected to said potential source for indicating a true course, said lamp and first and second switching means being interconnected whereby the lamp light only when both said switching means are brought into proper relationship, a plurality of condition indicating first visual means on the upper panel of the container, lamps for said first visual means each electrically responsive to the contact of the brushes with a corresponding one of said conductive segments upon rotation of the masking member, a plurality of condition remedying second visual means on the upper panel of the container, a switching means for selecting one of said condition-remedying visual means, a lamp on the upper panel for signifying that a proper selection has been made and the condition remedied, and circuit means for extinguishing each of said condition-indicating lamps as they are lighted in turn by the travel of said masking member and for lighting said condition-remedied lamp upon a proper selection whereby a simulated navigation of said space ship may then continue.

5. A game apparatus according to claim 4 in which said conductive segments are arranged in a series of concentric circles, said masking member is provided with a brush for each circle, and each of said brushes is connected to a contact on a multiple-position switch on the container for manual selection by the player of differing sequence orders in the lighting of said condition-indicating lamps.

References Cited in the file of this patent

UNITED STATES PATENTS

| | | |
|---|---|---|
| 2,844,374 | French | July 22, 1958 |
| 2,886,919 | Glass et al. | May 19, 1959 |